United States Patent

(12) United States Patent
Vergara et al.

(10) Patent No.: US 9,108,508 B2
(45) Date of Patent: Aug. 18, 2015

(54) POWER TAKE-OFF TRANSMISSION

(71) Applicants: Daniel Vergara, Madrid (ES); Juan Antonio J. Torres, Madrid (ES)

(72) Inventors: Daniel Vergara, Madrid (ES); Juan Antonio J. Torres, Madrid (ES)

(73) Assignee: DEERE & COMPANY, Moline, IL (US)

( * ) Notice: Subject to any disclaimer, the term of this patent is extended or adjusted under 35 U.S.C. 154(b) by 222 days.

(21) Appl. No.: 13/661,177

(22) Filed: Oct. 26, 2012

(65) Prior Publication Data

US 2013/0105268 A1 May 2, 2013

(30) Foreign Application Priority Data

Oct. 26, 2011 (DE) .......................... 10 2011 085 255

(51) Int. Cl.
*F16D 25/12* (2006.01)
*B60K 17/28* (2006.01)
*F16H 57/04* (2010.01)

(52) U.S. Cl.
CPC ............... *B60K 17/28* (2013.01); *F16D 25/123* (2013.01); *F16H 57/0413* (2013.01); *F16H 57/0473* (2013.01)

(58) Field of Classification Search
CPC ....... F16D 25/12; F16D 25/123; F16D 25/14; F16D 2048/0221; F16D 2048/0266
See application file for complete search history.

(56) References Cited

U.S. PATENT DOCUMENTS

| 6,035,989 | A * | 3/2000 | Matsuoka | .................. | 192/85.32 |
| 7,694,794 | B2 * | 4/2010 | Biles et al. | ................. | 192/70.12 |
| 7,946,266 | B2 * | 5/2011 | Knecht et al. | ............. | 123/90.17 |
| 2005/0172740 | A1 | 8/2005 | Ebihara et al. | | |
| 2009/0242302 | A1 * | 10/2009 | Fujiki | ........................ | 180/89.12 |

FOREIGN PATENT DOCUMENTS

| DE | 2753783 A1 | 6/1978 |
| DE | 3915264 A1 | 11/1990 |
| DE | 19918501 A1 | 11/1999 |
| EP | 0397990 A1 | 11/1990 |
| EP | 1630030 A2 | 3/2006 |

OTHER PUBLICATIONS

German Search Report dated Jul. 19, 2012 (5 pages).
European Search Report dated Jan. 30, 2013 (5 pages).

* cited by examiner

*Primary Examiner* — Huan Le

(57) ABSTRACT

A power take-off transmission has a power take-off clutch, a hydraulic supply, a hydraulically operable piston for activating a clutch plate set of the power take-off clutch, wherein the hydraulic supply comprises a hydraulic pump, a hydraulic reservoir and a hydraulic cooler and wherein a first hydraulic line hydraulically connects the hydraulic pump to the piston and a second hydraulic line branching off from the first hydraulic line hydraulically connects the hydraulic pump to the hydraulic cooler. In order to improve the cooling capacity and lubrication of the power take-off transmission, it is proposed that the hydraulic supply comprises a third hydraulic line, which hydraulically connects the hydraulic cooler to the clutch plate set, wherein the clutch plate set is hydraulically connected to the hydraulic reservoir.

9 Claims, 2 Drawing Sheets

POWER TAKE-OFF TRANSMISSION

FIELD OF THE DISCLOSURE

The disclosure relates to a power take-off transmission with a power take-off clutch, a hydraulic supply and a hydraulically operable piston for activating a clutch plate set of the power take-off clutch, wherein the hydraulic supply comprises a hydraulic pump, a hydraulic reservoir and a hydraulic cooler, a first hydraulic line connecting the hydraulic pump to the piston and a second hydraulic line connecting the hydraulic pump to the hydraulic cooler.

BACKGROUND OF THE DISCLOSURE

Power take-off transmissions are used on, among other things, agricultural vehicles such as haulers or tractors, but also on construction machinery and commercial vehicles, in order to provide the drive of a power take-off driven by the engine propelling the corresponding vehicle. Mechanisms which are attached to or trailed from the corresponding vehicle can be mechanically driven by means of the power take-off. Power take-off transmissions usually have a hydraulically operable clutch, via which the power take-off shaft can be brought into driving connection with the drive shaft of the power take-off transmission. The drive shaft is usually connected to the engine propelling the vehicle or to a drive train connected the propelling engine. The hydraulic coupling of the power take-off transmission usually has a clutch plate set, which is brought into frictional connection through the application of pressure to a hydraulically operable annular piston and can thereby be activated or closed, so that a drive moment supplied by the drive shaft is transferred to the power take-off shaft. When operating the power take-off transmission, particularly when operating the clutch, in other words, during the application of pressure to the annular piston and the creation of frictional connections in the clutch plate set resulting from this, the clutch and other transmission components warm up. Heat is thereby generated, which must be removed via the hydraulic fluid used both to operate the clutch and also to lubricate the transmission components. A power take-off transmission of this kind usually has a corresponding hydraulic supply or hydraulic assembly for this purpose, which comprises a hydraulic cooler, wherein the hydraulic liquid circulates continuously and is pumped out of a hydraulic reservoir or out of a transmission sump through the hydraulic cooler.

It is known that a hydraulic supply of this kind can be designed such that a first hydraulic line connects the hydraulic pump to the piston and a second hydraulic line branching off from the first hydraulic line connects the hydraulic pump to the hydraulic cooler, wherein a hydraulic supply to the annular piston is controlled via a proportional valve and parallel thereto a continuous circulation of hydraulic fluid through the hydraulic cooler is achieved by a pressure control valve disposed in the second hydraulic line. The clutch plate set is cooled by lubrication with the cooled hydraulic fluid and by the clutch plate set being connected to the transmission sump. However, cooling of this kind exhibits a relatively low cooling capacity and can only guarantee heat dissipation to some extent. Particularly where higher-powered transmissions are concerned, larger clutches or clutch plate sets have to be used, in order to guarantee the required heat dissipation. This is at variance with efforts currently being made to achieve a small overall size with greater power.

In order to improve the cooling capacity, it has been suggested that additional cooling circuits should be created, which enable the transmission and clutch to be cooled by separate channels in the corresponding components and using a hydraulic circuit separate from the hydraulic supply for the piston for activating the clutch. This is in turn complicated in terms of design, requires a large number of parts and is cost-intensive.

Thus the problem addressed by the disclosure is seen as being that of specifying a power take-off transmission of the kind mentioned above, by means of which the aforementioned problems can be overcome. In particular, the cooling capacity is to be improved without significantly increasing the structural complexity.

SUMMARY OF THE DISCLOSURE

According to the disclosure, a power take-off transmission of the kind indicated above is configured such that a third hydraulic line is provided, which hydraulically connects the hydraulic cooler to the clutch plate set, wherein the clutch plate set is hydraulically connected to the hydraulic reservoir. Due to the fact that the hydraulic fluid cooled by the hydraulic cooler is conducted straight into the clutch plate set, direct cooling of the clutch plates can take place. The cooling capacity is thereby increased without increasing the size of the clutch plate set. At the same time, the existing hydraulic supply is used, which means that no separately supplied cooling circuit is created. Due to the improved cooling capacity, higher-powered transmissions with the same overall size or else equally powered transmissions with a smaller overall size can be achieved overall without increased expenditure on parts and design or construction. By varying the hydraulic pressure required by the hydraulic pump or by varying the pump output, the cooling capacity can also be effectively and actually increased or reduced where necessary. The improved cooling capacity of the overall system also means that the service life is radically increased.

A first hydraulic valve for controlling a hydraulic piston supply may be disposed in the first hydraulic line and a second hydraulic valve in the second hydraulic line. The second hydraulic line may be branched straight off the first hydraulic line so that the integration of both valves in a combined valve manifold is also possible in principle. The first hydraulic valve disposed in the first hydraulic line is used to control the supply of the piston, preferably an annular piston, disposed to activate the clutch plate set. The hydraulic valve constitutes a supply in this case, such that in a first switch position the hydraulic fluid conveyed by the hydraulic pump is conducted via a discharge line into the second hydraulic line, wherein the introduction into the second hydraulic line takes place behind or else downstream of the second hydraulic valve. In a second switch position, the hydraulic fluid is conducted straight into the piston, intermediate positions between these two extreme switch positions are thereby likewise possible.

The second hydraulic valve is in the form of a pressure control valve, which is moved into the open position when a definable hydraulic pressure is reached. In a hydraulic state in which the pressure in the second hydraulic line is below the defined hydraulic pressure, the second hydraulic valve is in a dosed setting, which is achieved, for example, by an adjusting spring on the closed setting side of the second hydraulic valve. This hydraulic state is preferably reached when the first hydraulic valve is in the first switch position. Only when the hydraulic fluid is conducted into the second switch position in the piston through activation of the first hydraulic valve, the hydraulic pressure in the second hydraulic line rises too, until the definable hydraulic pressure is finally reached and the pressure control valve is moved into the open position. This may be realized via a control pressure line, which leads from the second hydraulic line into the opening end of the second hydraulic valve before or upstream of the second hydraulic valve, wherein the control pressure line works against the adjusting spring, so that said adjusting spring yields when the definable hydraulic pressure is reached. The definable hydraulic pressure at which the second hydraulic valve is to be moved into the open position is set depending on the design or setting of the adjusting spring. Other pressure control variants are also conceivable here, for example involving the use of a spring preloaded non-return valve.

The first hydraulic valve may be in the form of an electromagnetically operable 4/2-way proportional valve. Positions between the aforementioned extreme switch positions can also be set. The proportional valve may be electrically switched or activated by means of an electromagnetic coil, which as electromagnetically against an adjusting spring in an energized state.

The power take-off transmission may be further designed such that the piston is mounted on a drive shaft of the power take-off transmission, wherein the first hydraulic line comprises a first hydraulic channel at least partially formed in the drive shaft and leading to the piston and is hydraulically connected thereto. The hydraulic channel may, for example, be formed by one or a plurality of adjoining bores, which extend through an inside of the drive shaft. This channel preferably has a section running axially to the drive shaft and a section running radially to the drive shaft, wherein the channel preferably leads at one end into an end section of the drive shaft and at the other end into a section on which the piston is mounted.

The power take-off transmission may in addition be designed such that a drive shaft is contained on which the power take-off transmission is mounted, the third hydraulic line comprising a second hydraulic channel formed at least partially in the drive shaft and leading to the clutch plate set and being hydraulically connected to the latter. The hydraulic channel may be formed by one or a plurality of adjoining bores, for example, which extend through an inside of the drive shaft. This channel preferably has a section running axially to the drive shaft and a section running radially to the drive shaft, wherein the second hydraulic channel is preferably mounted at one end in an end area of the drive shaft and at the other end in a section on which the power take-off transmission is mounted and, in particular, the clutch plate set is disposed.

The second hydraulic channel is at least partially formed in the power take-off clutch and may lead in a plurality of arranged partial channels to the clutch plate set. The partial channels may be partially aligned in parallel and extend radially into the clutch plate set from a partial channel extending axially. In this way, the cooling by the hydraulic fluid can be distributed and introduced in a more selective fashion, so that the clutch plates are cooled more effectively.

The power take-off transmission is moreover designed such that the hydraulic reservoir is at least partially formed as a power take-off transmission sump, so that the hydraulic fluid conducted through the clutch plates set flows into the transmission sump.

BRIEF DESCRIPTION OF THE DRAWINGS

An embodiment of the disclosure is described in detail below with reference to the accompanying drawings wherein.

DETAILED DESCRIPTION OF THE DRAWINGS

Figure 1:
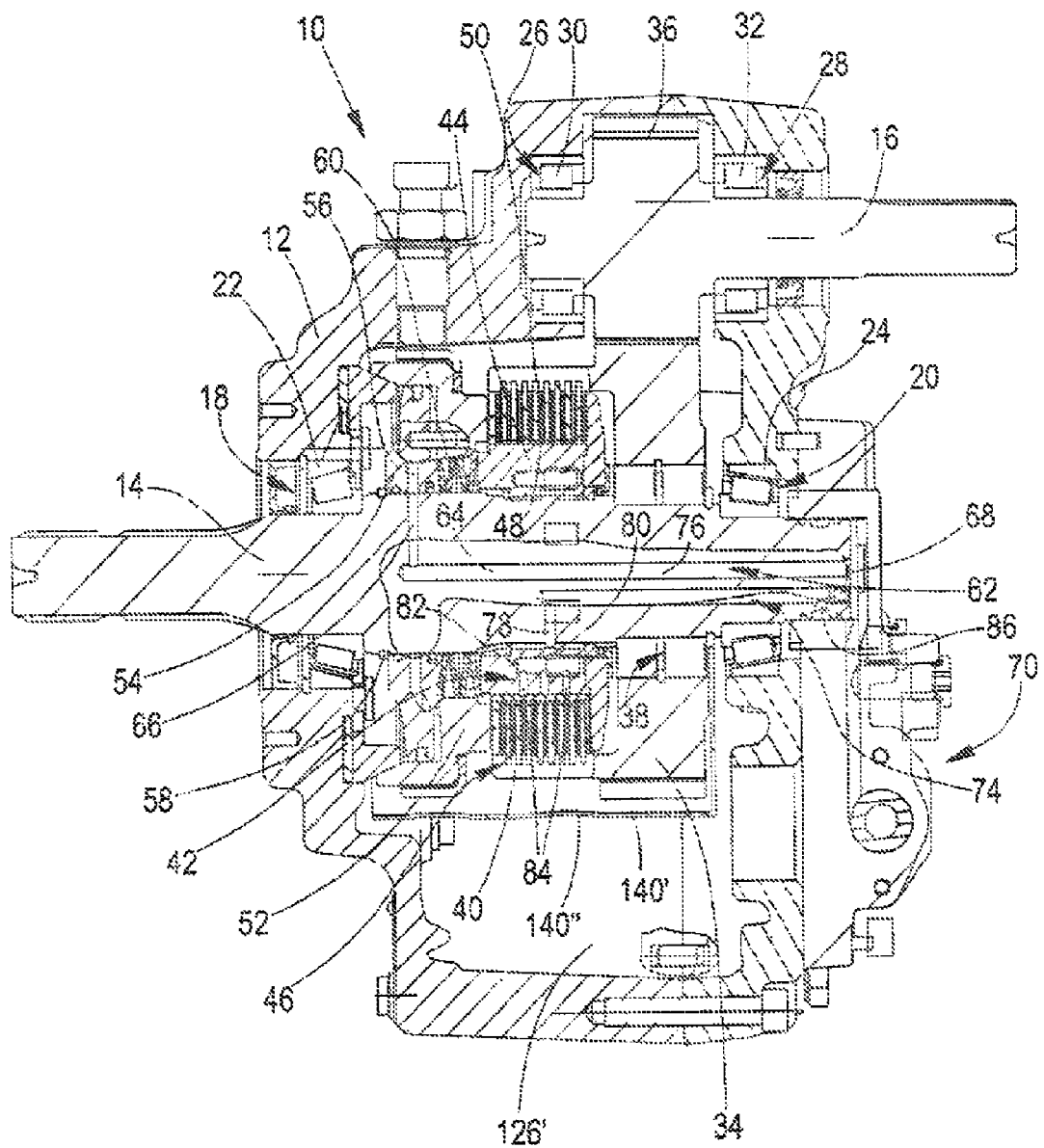
FIG. 1 is a schematic cross-sectional view of a power take-off transmission according to the disclosure; and, FIG. 2 is a circuit diagram of a hydraulics apply for the power take-off transmission depicted in FIG. 1.

As illustrated in FIG. 1, a power take-off transmission 10 comprise a transmission housing 12, in which a drive shaft 14 and an output shaft 1$ in the form of a power take-off shaft are mounted. The drive shaft is mounted on the housing 12 with an anti-friction bearing 22, 24 in each case at first and second bearing points 18 and 20, respectively. The output shaft 16 is mounted on the housing 12 with an anti-friction bearing 30, 32 at third and forth bearing points 26 and 28, respectively.

A driving gearwheel 34 is dispose on the drive shaft 14, which engages with teeth 36 formed on the output shaft 16. The driving gearwheel 34 is mounted on the drive shaft 14 by means of an anti-friction bearing assembly 38 and connected via a clutch collar 40 to a power take-off clutch 42 in the form of a disc clutch or plate clutch. The power take-off clutch 42 comprises a clutch carrier 44 connected non-rotatably to the drive shaft 14, and also a clutch plate set 46, which comprises clutch plates 48 mounted on the, clutch carrier 44 at the drive shaft end and clutch plates 50 mounted on the clutch collar 40 at the driving gearwheel end.

In addition, a hydraulically operable piston 52 for operating and activating the clutch plate sets 46 is arranged. The piston 52 is in the form of a ring piston and is mounted in an axially displaceable manner on the drive shaft 14 and on a piston carrier 54. Between the piston 52 and the piston carrier 54 a pressure chamber 56 is formed, The piston carrier 54 is axially secured on the drive shaft 14 via a securing ring 58. Between the piston 52 and the clutch carrier 44 extends a plate spring assembly 60, which pre-tensions the piston 52 against the piston carrier 54. To activate the power take-off clutch or else the clutch plate set 46, the pressure chamber 56 is exposed to hydraulic liquid via a first hydraulic channel 62. The first hydraulic channel 62, as an axial bore 64 to which a radial bore 66 connects, is formed within the drive shaft 14. The radial bore 66 leads from the axial bore 64 into a section of the pressure compartment 56. The axial bore 64 connects the radial bore 66 to an and section 68 of the drive shaft 14. The end section of the drive shaft 14 is hydraulically connected to a hydraulic valve manifold 70, which represents part of a hydraulic supply 72 (FIG. 2) to the power take-oft transmission 10.

The drive shaft 14 further comprises a second hydraulic channel 74. The second hydraulic channel 74 is on the one hand likewise formed as an axial bore 76 within the drive shaft 14, to which a radial bore 78 connects, wherein the radial bore 78 furthermore leads from the axial bore 76 into a section of the clutch carrier 44. On the other hand, the second hydraulic channel 74 is formed in the clutch carrier 44, as a further radial bore 80, which opens into a further axial bore 82. Finally, further individual radial bores 84, which open into the clutch plate set 46, extend in the second hydraulic channel 74 starting from the axial bore 82. The axial bore 82 in the inside of the clutch carrier 44 along with the further radial bores 84 form a kind of manifold. Here too, the axial bore 76 within the drive shaft 14 connects the radial bore 78 to the end section 68 of the drive shaft 14, in which a further radial bore 86 is formed for connection to the hydraulic supply 72 (FIG. 2) or else to the hydraulic valve manifold 70.

Figure 2:
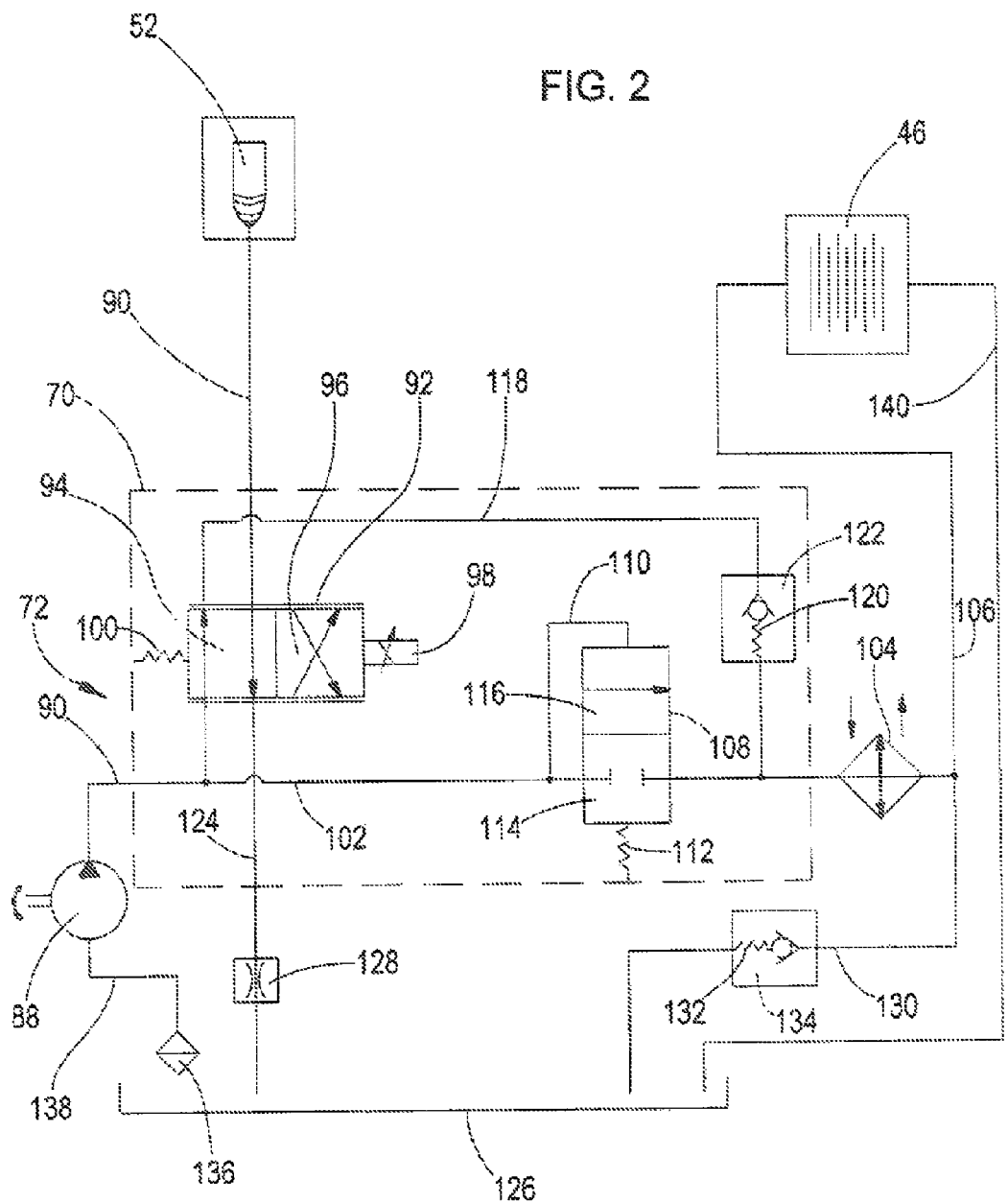

The hydraulic supply 72 of the power take-off transmission 10, which is used firstly for hydraulic operation or activation and secondly for lubrication and cooling of the power take-off transmission 10 is presented in detail in FIG. 2. Apart from the hydraulic valve manifoid 70, it comprises a mechanically driven hydraulic pump 88, which is driven via a drive connection (not shown) from the drive shaft 14 (FIG. 1) of the power take-off transmission 10. Starting from the hydraulic pump 88 there extends a first hydraulic line 90, which leads to the piston 52 via a first hydraulic valve 92 in the form of a 4/2-way proportional valve, wherein the hydraulic supply to the piston 52 is interrupted in a closed position 94 (switch position as depicted in FIG. 2) and created in an open position 96. Through an electromagnetically operable magnetic coil 98, which acts against an adjusting spring 100, the first hydraulic valve 92 can be moved from the closed position 94 into the open position 96 and into switch positions lying correspondingly in between. From the first hydraulic line 90, a second hydraulic line 102 branches off upstream of the first hydraulic line 90, said second hydraulic line leading into a hydraulic cooler 104 and thereby connecting the hydraulic pump 88 to the hydraulic cooler 104. In addition, a third hydraulic line 106 is provided, which connects the hydraulic cooler to the clutch plate set 46. Upstream of the hydraulic cooler 104 a second hydraulic valve 108 in the form of a pressure control valve is disposed in the second hydraulic line 102, said valve being capable of being moved via a control pressure line 110 towards an adjusting spring 112 from a closed position 114 (switch position as depicted in FIG. 2) into an open position 116, as soon as a definable pressure value is set in the second hydraulic line 102. The definable pressure value may in this case be defined accordingly through the setting or design of the adjusting springs 112. A first discharge line 118 flows from the first hydraulic valve 92 into the second hydraulic line 102, between the hydraulic cooler 104 and a second hydraulic valve 108. A non-return valve 122 opening downstream towards an adjusting spring 120 is arranged in the first discharge line 114. A second discharge line 124 connects the first hydraulic valve 92 to a hydraulic reservoir 126. The discharge of hydraulic liquid in the second discharge line 124 is throttled by a throttle or aperture 128 disposed there. A third discharge line 130 extends from the third hydraulic line 106, said discharge line leading into the hydraulic reservoir 126 via a non-return valve 134 opening upstream towards an adjusting spring 132. Hydraulic fluid can be drawn from the hydraulic reservoir 126 via a hydraulic filter 136 by means of a suction line 138 by the hydraulic pump 88 and conveyed for the pressure supply to the piston 52 and for the cooling and lubrication of the power take-off transmission 10 or of the power take-off clutch 42 and of the clutch plate set 46. A further hydraulic connection 140 is formed between the clutch plate set 46 and the hydraulic reservoir 126. As can be seen in FIG. 1, the hydraulic reservoir 126 is in the form of a power take-off transmission sump 126', which is hydraulically connected to the power take-off clutch 42 via an opening 140" formed in a partition plate 140' beneath the power take-off clutch 42, so that the hydraulic fluid from the power take-off clutch 42 can flow into the power take-off transmission sump 126'. The hydraulic connection 140 illustrated in FIG. 2 therefore represents the configuration of a partition plate 140' provided with an opening 140" in FIG. 1. As emerges from FIG. 2, the first hydraulic valve 92, the first discharge line 118, the non-return valve 122 and the second hydraulic valve 108 are formed in the hydraulic valve manifold 70 and are jointly flanged onto the transmission housing 12 as a hydraulic valve combination (see FIG. 1).

As emerges particularly from a synopsis in FIG. 1 and FIG. 2, the first hydraulic channel 62 represented in FIG. 2, which contains the axial bore 64 and the radial bore 66, is enclosed by the first hydraulic line 90, which connects the hydraulic pump 88 to the piston 52. In addition, the second hydraulic channel 74 represented in FIG. 2, which firstly contains the axial bore 76 and the radial bores 78 and 86 and secondly the radial bore 80, the axial bore 82 and the individual radial bores 84, is enclosed by the third hydraulic line 106, which connects the hydraulic cooler 104 to the clutch plate set 46.

The following effect is achieved overall by the power take-off transmission 10 with the hydraulic supply 72 represented in the exemplary embodiment. The hydraulic pump 88 conveys hydraulic fluid from the hydraulic reservoir 126 or from the power take-off transmission sump 126'. Via the first hydraulic line 90, which encloses the first hydraulic channel 62, hydraulic fluid reaches the piston, insofar as the first hydraulic valve 92 is actuated into an open position 96. The hydraulic fluid reaches the pressure chamber 56 of the piston 52 under pressure, whereupon said piston has pressure applied to it and is moved in the direction of the clutch plate set 46, to activate the same. The clutch plates 48, 50 are frictionally connected and create a drive connection between the drive gearwheel 34 and the output shaft 16. At the same time, hydraulic fluid is conducted through the pressure control valve 108, which is moved into the open position on account of the rising pressure in the first and second hydraulic line 90, 102. The hydraulic fluid flows via the second hydraulic line 102, which includes the second hydraulic channel 74, into the clutch plate set 46, which is thereby cooled and lubricated. From there, the hydraulic fluid reaches the hydraulic reservoir 126 or the power take-off transmission sump via a hydraulic connection 140, which is made in FIG. 1 as a simple opening 140" between the power take-off clutch 42 and the power take-off transmission sump 126', and the cycle begins all over again. In the event that the first hydraulic valve 92 is moved into a closed position, hydraulic fluid flows via the first discharge line 118 through the cooler 104 and from there, as already described, into the clutch pate set 46 and further back into the hydraulic reservoir 126 or into the power take-off sump 126'. In this case the second hydraulic valve 108 remains in the closed position 114, as no corresponding pressure is able to build up which would move it into the open position 116. A residue of hydraulic fluid may flow out of the pressure chamber 56 through the second discharge line 124 into the hydraulic reservoir 126. Consequently, irrespective of a hydraulic actuation or exposure to pressure of the piston in the two hydraulic operating states of the power take-off transmission depicted, it is guaranteed that the power take-off clutch is lubricated and cooled.

Having described the preferred embodiment, it will become apparent that various modifications can be made without departing from the scope of the disclosure as defined in the accompanying claims.

The invention claimed is:

1. A power take-off transmission having a power take-off clutch, a hydraulic supply, a hydraulically operable piston for activating a clutch plate set of the power take-off clutch, wherein the hydraulic supply comprises a hydraulic pump, a hydraulic reservoir and a hydraulic cooler and wherein a first hydraulic line hydraulically connects the hydraulic pump to the piston and a second hydraulic line branching off from the first hydraulic line hydraulically connects the hydraulic pump to the hydraulic cooler, wherein the hydraulic supply comprises a third hydraulic line, which hydraulically connects the hydraulic cooler to the clutch plate set, wherein the clutch plate set is hydraulically connected to the hydraulic reservoir.

2. A power take-off transmission according to claim 1, wherein a drive shaft is provided on which the piston is mounted, wherein the first hydraulic line comprises a first hydraulic channel at least partially formed in the drive shaft and leading to the piston.

3. A power take-off transmission according to claim 1, wherein a drive shaft is provided on which the power take-off clutch is mounted, the third hydraulic line comprising a second hydraulic channel formed at least partially in the drive shaft and leading to the clutch plate set.

4. A power take-off transmission according to claim 3, wherein the second hydraulic channel is at least partially formed in the power take-off clutch and starting from the drive shaft leads in a plurality of arranged partial channels to the clutch plate set.

5. A power take-off transmission according to claim 1, wherein the hydraulic reservoir is at least partially formed as a power take-off transmission sump.

6. A power take-off transmission according to claim 1, wherein the clutch plate set is hydraulically connected to the hydraulic reservoir by a fourth hydraulic line.

7. A power take-off transmission according to claim 1, wherein a first hydraulic valve for controlling a hydraulic piston supply is disposed in the first hydraulic line and a second hydraulic valve in the second hydraulic line.

8. A power take-off transmission according to claim 7, wherein the second hydraulic valve is in the form of a pressure control valve, which is moved into the open position when a definable hydraulic pressure is reached.

9. A power take-off transmission according to claim 7, wherein the first hydraulic valve is in the form of an electro-magnetically operable 4/2-way proportional valve.

\* \* \* \* \*